(12) United States Patent
Grady

(10) Patent No.: US 7,486,820 B2
(45) Date of Patent: Feb. 3, 2009

(54) SYSTEM AND METHOD FOR MULTILABEL RANDOM WALKER SEGMENTATION USING PRIOR MODELS

(75) Inventor: Leo Grady, Yardley, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 575 days.

(21) Appl. No.: 11/234,965

(22) Filed: Sep. 26, 2005

(65) Prior Publication Data

US 2006/0147126 A1  Jul. 6, 2006

Related U.S. Application Data

(60) Provisional application No. 60/641,904, filed on Jan. 6, 2005.

(51) Int. Cl.
G06K 9/62 (2006.01)
G06K 9/34 (2006.01)

(52) U.S. Cl. ........................ 382/173; 382/160

(58) Field of Classification Search .......... None
See application file for complete search history.

(56) References Cited

U.S. PATENT DOCUMENTS 5,978,497 A * 11/1999 Lee et al. ............... 382/133
6,718,063 B1 * 4/2004 Lennon et al. ........... 382/224
6,744,923 B1 * 6/2004 Zabih et al. .............. 382/226
2004/0008886 A1 * 1/2004 Boykov .................... 382/173
2004/0086185 A1 * 5/2004 Sun .......................... 382/224

OTHER PUBLICATIONS

"Multi-label Image Segmentation for Medical Applications Based on Graph-Theoretic Electrical Potentials", Leo Grady and Gareth Funka-Lea, CVAMIA-MMBIA 2004, LNCS 3117, pp. 230-245, 2004.*

* cited by examiner

Primary Examiner—Matthew C Bella
Assistant Examiner—Yuzhen Ge (57) ABSTRACT

A method of segmenting a digitized image includes providing a digitized image comprising a plurality of intensities corresponding to a domain of nodes on an N-dimensional grid, providing prior probabilities for a set of segments, and initializing probabilities that each node belongs to each segment, defining a weight between each pair of adjacent nodes in the image based on the intensity difference of each said node pair, formulating a set of equations that minimize an energy functional of the probabilities and weights, and solving said set of equations for the probability that each node belongs to each segment.

23 Claims, 4 Drawing Sheets

SYSTEM AND METHOD FOR MULTILABEL RANDOM WALKER SEGMENTATION USING PRIOR MODELS

CROSS REFERENCE TO RELATED UNITED STATES APPLICATIONS

This application claims priority from "Multilabel Random Walker Segmentation Using Prior Models", U.S. Provisional Application No. 60/641,904 of Leo Grady, filed Jan. 6, 2005, the contents of which are incorporated herein by reference.

TECHNICAL FIELD

This invention is directed to automated and semi-automated segmentation of digitized images.

DISCUSSION OF THE RELATED ART

The choice of an appropriate segmentation algorithm often depends on the task of a computer vision system. Typical machine learning and statistical pattern recognition systems make decisions about test points without making use of their relationship to each other. Due to the spatial nature of an image, such approaches are often inappropriate and their application results in noisy segmentation with many small, one or two pixel, pieces of an object scattered through an image. This is why the computer vision community has trended toward spatial algorithms, such as normalized cuts, graph cuts, watersheds, level sets, and random walker algorithms. However, in some segmentation scenarios, the objects of interest may be reasonably characterized by an intensity (feature) distribution. For such a situation, one wants to integrate intensity information into a spatial algorithm. Viewing a segmentation algorithm as a mapping $S: I \rightarrow G$, of an image I, to a set of labels G, an aspatial segmentation algorithm can be defined as any segmentation algorithm such that $S(PI)=PG$ for all permutations P and images I. Likewise, a spatial segmentation algorithm can be defined as one for which there exists a permutation for some images (of constant size) for which the aspatial definition does not hold. A straightforward application of a neural network classifier to pixel intensities is an example of an aspatial algorithm, since the classification depends only on the input intensity rather than the intensities of neighboring pixels.

The recently introduced random walker segmentation algorithm has been shown to have desirable theoretical properties and to perform well on a wide variety of images in practice. The algorithm was designed to be a general purpose segmentation tool, such that a user could mark a few pixels with an arbitrary number of labels and expect a quality result, regardless of the data set or the segmentation goal. A segmentation is obtained for a pixel by computing, for each label, the probability that a random walker starting its walk at that pixel first reaches a seed with that label. The pixel is then assigned the label with the greatest probability. A user-specified seed is a pixel that has been given a labeling by the user. It has been shown that the probabilities can be computed analytically by solving a sparse, symmetric, positive-definite system of linear equations instead of performing an actual random walk simulation.

Specifically, it was shown in this inventor's copending application titled "System and Method for Multi-Label Image Segmentation", U.S. Application Serial No. 11/029,442, filed Jan. 5, 2005, the contents of which are incorporated herein by reference, that the random walker algorithm has the following properties:

1. The solution for the probabilities is unique.

2. The expected value of the probabilities for an image of pure noise, given by identically distributed (not necessarily independent) random variables, is equal to those obtained on a uniform image.

3. The expected value of the probabilities in the presence of random, uncorrelated weights is equal to the probabilities obtained by using weights equal to the mean of each random variable.

However, the random walker algorithm has three properties of concern for some segmentation tasks. First, each segment must be connected to a seed. Second, only intensity gradients are used, instead of employing absolute intensity information. Third, the algorithm requires user supplied labels. These properties are desirable for many segmentation tasks. For example, ignoring absolute intensity information increases robustness to quantization, shifts or inverted intensities, and requiring connectedness of each segment to a seed prevents a noisy scattered segmentation of small regions. However, segmentation of an image where the objects of interest have a great many disconnected pieces is tedious for the user, since a seed should placed inside each disconnected piece. If as consistent intensity profile characterizes an object of interest, then this information should be incorporated into the segmentation. Finally, one could have an object intensity model, but use input could be unavailable.

The mixing of spatial and aspatial approaches is not new in computer vision. For energy methods of segmentation, this is often achieved by adding spatial and aspatial energy terms and performing minimization of the total energy. Another approach is to combine a graph cuts method with a data term representing priors. A graph cuts method can also be used to find a minimum cuts between user specified seed groups. The random walker and graph cuts methods obtain image segmentation from the minimum of the same functional, with the difference that the random walker method minimizes the functional over the space of real numbers, while the graph cuts method performs the minimization over the set of integers. Thus, the segmentations obtained from the two methods have different properties and could behave differently in different circumstances. In particular, the random walker algorithm does not suffer from the "small cut" effect of graph cuts, yields a unique minimum to the functional, has provable robustness to noise, gives a guaranteed minimum of the functional with an arbitrary number of labels, and yields a probability that a given node belongs to a segment that could be interpreted as a confidence value. In contrast, the graph cut algorithm is guaranteed to give the minimum cut between two groups of labeled nodes.

Figure 1:
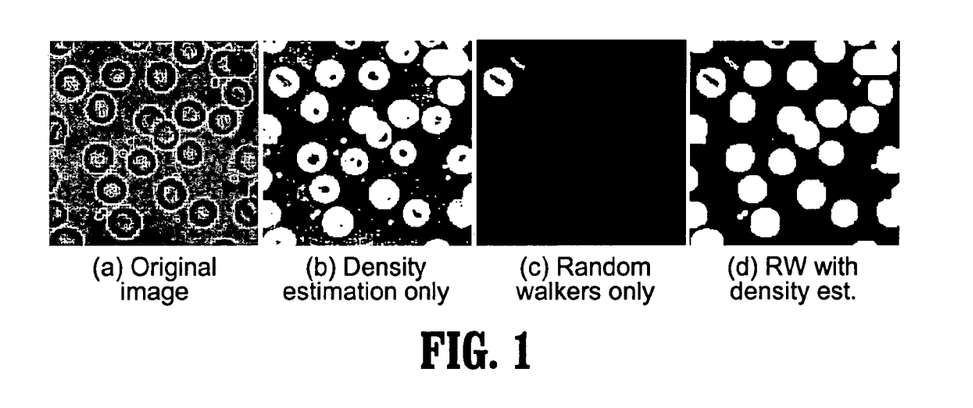
FIGS. 1(a)-(d) illustrate the results of joining an aspatial algorithm, represented by density estimation, with an exemplary spatial random walker algorithm.

FIGS. 1(a)-(d) illustrate the results of joining an aspatial algorithm, represented by density estimation, with an exemplary spatial random walker algorithm. A user has supplied two groups of seeds representing the "blood cell" label and the "background" label. The user-specified seeds are indicated by gray markers in FIG. 1(a). FIG. 1(b) depicts the result of a density estimation, FIG. 1(c) depicts the result of a random walker algorithm, and FIG. 1(d) represents the result of a random walker combined with a density estimation. In FIGS. 1(b), (c) and (d), white regions correspond to pixels labeled "cell" and black regions correspond to pixels labeled "background". The random walker algorithm by itself is capable of finding a spatially coherent object, but unable to locate similar, disconnected pieces. A density estimation classifies disconnected pixels, but yields a fractured, noisy, segmentation that lacks spatial cohesion. Use of a density estimation as a set of priors to the random walker algorithm results in a segmentation that overcomes the limitations of both individual approaches.

SUMMARY OF THE INVENTION

Exemplary embodiments of the invention as described herein generally include methods and systems for combining the intensity profiling and long-range aspects of an aspatial approach with the spatial cohesion of the random walker algorithm by blending image priors into the random walk and extending the random walk algorithm to eliminate the need for user-specified labels. An extended random walker algorithm according to an embodiment of the invention uses an intensity model obtained either a priori or via a density estimation from user-input seeds. For purpose of simplifying the description, embodiments of the invention will be described in terms of images with a single value, referred to as an intensity, two labels and user-specified seeds. However, it is to be understood that methods according to embodiments of the invention can be applied to multi-channel images, an arbitrary number of labels, and without user interaction. An extended random walker according to an embodiment of the invention can produce a correct result despite variability of intensity values present in an image.

According to one aspect of the invention, there is provided a method for segmenting a digitized image including the steps of providing a digitized image comprising a plurality of intensities corresponding to a domain of nodes on an N-dimensional grid, providing prior probabilities for a set of segments, and initializing probabilities that each node belongs to each segment, defining a weight between each pair of adjacent nodes in the image based on the intensity difference of each said node pair, formulating a set of equations that minimize an energy functional of the probabilities and weights, and solving said set of equations for the probability that each node belongs to each segment.

According to a further aspect of the invention, each said weight $w_{ij}$ between a node $v_i$ adjacent to node $v_j$ is determined by $$w_{ij} = \exp\left(\frac{\beta}{\rho}(I_i - I_j)^2\right) + \varepsilon,$$

wherein $I_i$ and $I_j$ are the intensities of nodes i and j, respectively, $\beta$ is a free parameter, $\varepsilon$ is a constant and $\rho$ is a normalizing factor.

According to a further aspect of the invention, the prior probabilities for the set of segments are known a priori.

According to a further aspect of the invention, the method comprises representing said image by a Laplacian matrix L indexed by node pairs, wherein an element $L_{ij}$ for nodes i and j is defined by $$L_{ij} = \begin{cases} d_i & \text{if } i = j, \\ -w_{ij} & \text{if } i \text{ and } j \text{ represent adjacent nodes}, \\ 0 & \text{otherwise}, \end{cases}$$

wherein $d_i = \Sigma w_{ij}$ for all weights incident on node i.

According to a further aspect of the invention, the set of equations is $$\left(L + \gamma \sum_{r=1}^{k} \Lambda^r\right) x^s = \lambda^s,$$

wherein L is said Laplacian matrix, $x^s$ is a vector of probabilities that each node belongs to a segment labeled by s, $\lambda^s$ is a vector of prior probabilities that each node belongs to a probability distribution for a segment labeled by s, $\Lambda$ is a diagonal matrix formed from said prior probabilities, and $\gamma$ is a free parameter.

According to a further aspect of the invention, the method comprises user-marked nodes identifying said segments, and wherein said set of equations for unmarked nodes is $$\left(L_U + \gamma \sum_{r=1}^{k} \Lambda_U^r\right) x_U^s = \lambda_U^s + Bf^s,$$

wherein L is decomposed as $$L = \begin{bmatrix} L_M & B \\ B^T & L_U \end{bmatrix},$$

wherein $L_M$ is the Laplacian for the marked points, $L_U$ is the Laplacian for the unmarked points, and B comprises those elements of L that are left over, and $f^s$ is a function.

According to a further aspect of the invention, the set of equations are solved using a preconditioned conjugate gradient technique.

According to a further aspect of the invention, generating prior probabilities comprises defining a set of training nodes and estimating said prior probability density from a set of training images, wherein the prior probability $\lambda_i^s$ that a node $v_i$ is generated from a distribution corresponding to a segment $g^s$ is generated through $$\lambda_i^s = \frac{1}{Z^s} \sum_{q=g^s} \exp\left(\frac{(I_i - t_q)^2}{\sigma}\right)$$

wherein the sum is over all segments, $\sigma$ is a free parameter, $I_i$ is the intensity of node $v_i$, $t_q$ is the intensity of training node labeled by q, $Z^s$ is a normalizing constant for segment $g^s$ equal to $$Z^s = \sum_{p=0}^{255} \sum_{q=g^s} \exp\left(\frac{(p - t_q)^2}{\sigma}\right)$$

wherein the sum over p is over all intensity levels.

According to a further aspect of the invention, each node is assigned to a segment with a highest probability.

According to a further aspect of the invention, the prior probability distribution is generated based on a texture analysis of said image.

According to a further aspect of the invention, the method comprises filtering said image before generating the prior probability distribution.

According to a further aspect of the invention, $\epsilon$ is $1e^{-6}$, and $\rho=\max(I_i-I_j)$ for all nodes i,j.

According to another aspect of the invention, there is provided a program storage device readable by a computer, tangibly embodying a program of instructions executable by the computer to perform the method steps for segmenting a digitized image.

DETAILED DESCRIPTION OF THE PREFERRED EMBODIMENTS

Exemplary embodiments of the invention as described herein generally include systems and methods for an extended random walker algorithm that uses an intensity model obtained either a priori or via a density estimation from user-input seeds.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2 - or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

According to an embodiment of the invention, an image is treated as a discrete object, that is, a graph with a fixed number of vertices and edges. Each edge is assigned a real-valued weight corresponding to the likelihood that a random walker will cross that edge. Thus, a weight of zero implies that the walker cannot move along that edge. Formulation of the methods on a graph allows the application of the algorithm to surface meshes and space-variant images. Regardless of the dimension of the data, the term "pixel" is used herein to refer to the basic picture element in the context of its intensity values, while the term "node" will be used herein in the context of a graph-theoretical discussion.

The language of graph theory is suitable for problems formulated on a discrete space, such as a digitized image. A graph is a pair G=(V;E) with vertices (nodes) $v \in V$ and edges $e \in E \subseteq V \times V$. An edge, e, spanning two vertices, $v_i$ and $v_j$, is denoted by $e_{ij}$. Let n=|V| and m=|E|, where || denotes cardinality. A weighted graph assigns a value to each edge called a weight. The weight of an edge, $e_{ij}$, is denoted by $w(e_{ij})$ or $w_{ij}$. The degree of a vertex is $d_i=\Sigma w(e_{ij})$ for all edges $e_{ij}$ incident on $v_i$. In the context of 2D image processing, the graph nodes are taken as the image pixels, which lie on a rectangular, 4-connected, grid.

Given a weighted graph, a set of marked (labeled) nodes, $V_M$, and a set of unmarked nodes, $V_U$, such that $V_M \cup V_U = V$ and $V_M \cap V_U = \{\}$, one would like to label each node $v_i \in V_U$ with a label from the set $G=\{g_1, g_2, \ldots, g_k\}$ having cardinality k=|G|. A node $v_i \in V_U$ is referred to as free because its label is not initially known. Assume that each node $v_i \in V_M$ has also been assigned a label $y_i \in G$. The random walker approach is to assign to each node $v_i \in V_U$ the probability $x_i^s$ that a random walker starting from that node first reaches a marked node $v_j \in V_M$ assigned to label $g^s$. The segmentation is then completed by assigning each free node to the label for which it has the highest probability, i.e., $y_i = \max_s x_i^s$. Note that the values for $y^i$, if $v_i \in V_M$, are given by user-interaction.

It is known that the minimization of the spatial energy functional $$E_{spatial}(x_j) = x^{sT} L x^s$$

for an n×1, real-valued, vector, $x^s$, defined over the set of nodes yields the probability $x_i^s$ that a random walker starting from node $v_i$ first reaches a node $v_j \in V_M$ with label $g^s$ (set to $x_j^s=1$), as opposed to first reaching a node $v_j \in V_M$ with label $g^{q \neq s}$ (set to $x_j=0$). Here, L represents the combinatorial n % n Laplacian matrix defined as $$L_{v_i v_j} = \begin{cases} d_{v_i} & \text{if } i=j, \\ -w_{ij} & \text{if } v_i \text{ and } v_j \text{ are adjacent nodes,} \\ 0 & \text{otherwise} \end{cases}$$

where $L_{v_i v_j}$ is used to indicate that the matrix L is indexed by vertices $v_i$ and $v_j$.

By partitioning the Laplacian matrix into marked (i.e., pre-labeled) and unmarked (i.e., free) blocks $$L = \begin{bmatrix} L_M & B \\ B^T & L_U \end{bmatrix},$$

and denoting an $|V_M| \times 1$ indicator vector, $f^s$, as $$f_j^s = \begin{cases} 1 & \text{if } y_j = g^s, \\ 0 & \text{if } y_j \neq g^s, \end{cases}$$

the minimization of the spatial functional with respect to $x_U^s$ is given by the system $$L_U x_U^s = -B f^s, \quad (1)$$

which is a sparse, symmetric, positive-definite, system of linear equations. By virtue of $x_i$ being a probability, $$\sum_s x_i^s = 1 \forall i,$$

only k−1 linear systems need be solved, since the final system can calculated from the above property. Although a random walker method is being used for segmentation, the connection with potential theory allows one to simply and deterministically solve a system of linear equations to find the probabilities. The mathematics above reveals one property of the random walker algorithm: in the absence of labeled points (i.e., $V_M = \{\}$), the probabilities are undefined. However, the incorporation of priors into the above framework yields a segmentation algorithm that need not have user interaction to mark some nodes as seeds beforehand.

Consider a set of real-valued, pointwise (i.e. aspatial) priors $\lambda_i^j$ that represent the probability density that the intensity at node $v_i$ belongs to the intensity distribution of label $g^j$. Following a Bayesian approach, the probability that a node $v_i$ belongs to label $g^j$ is given by $$x_i^s = \frac{\lambda_i^s}{\sum_{s=1}^{k} \lambda_i^s}.$$

If the absence of the node index i is interpreted to mean a vector quantity over the space of nodes, this probability can be written in vector notation as the solution to $$\left(\sum_{q=1}^{k} \Lambda^q\right) x^s = \lambda^s, \qquad (2)$$

where $\Lambda^s$ is understood to be a diagonal matrix with the values of $\lambda^s$ on the diagonal.

The equation (2) is the minimum energy distribution for the aspatial functional $$E_{aspatial}^s(x^s) = \sum_{q=1, q \neq s}^{k} x^{qT} \Lambda^q x^q + (x^s - 1)^T \Lambda^s (x^s - 1). \qquad (3)$$

The aspatial and spatial energies can be combined into a single functional with the introduction of a free parameter $\gamma$ as $$E_{Total}^s = E_{spatial}^s + \gamma E_{aspatial}^s,$$

which can be minimized with respect to the free (not pre-labeled) nodal probabilities. Without loss of generality, it can be assumed that there are no pre-labeled nodes, in which case the minimum energy is obtained when $x^j$ satisfies the solution to $$\left(L + \gamma \sum_{r=1}^{k} \Lambda^r\right) x^s = \lambda^s. \qquad (4)$$

Note that, despite the singularity of L, the combined matrix above is guaranteed to be positive definite and non-singular since L is positive semi-definite and the diagonal matrices are strictly positive definite. Thus, the incorporation of priors into the formulation circumvents the need for user-specified labels. However, if desired, user-specified labels can be incorporated by solving $$\left(L_U + \gamma \sum_{r=1}^{k} \Lambda_U^r\right) x_U^s = \lambda_U^s + B f^s, \qquad (5)$$

for the unlabeled nodes $V_U$.

Figure 2:
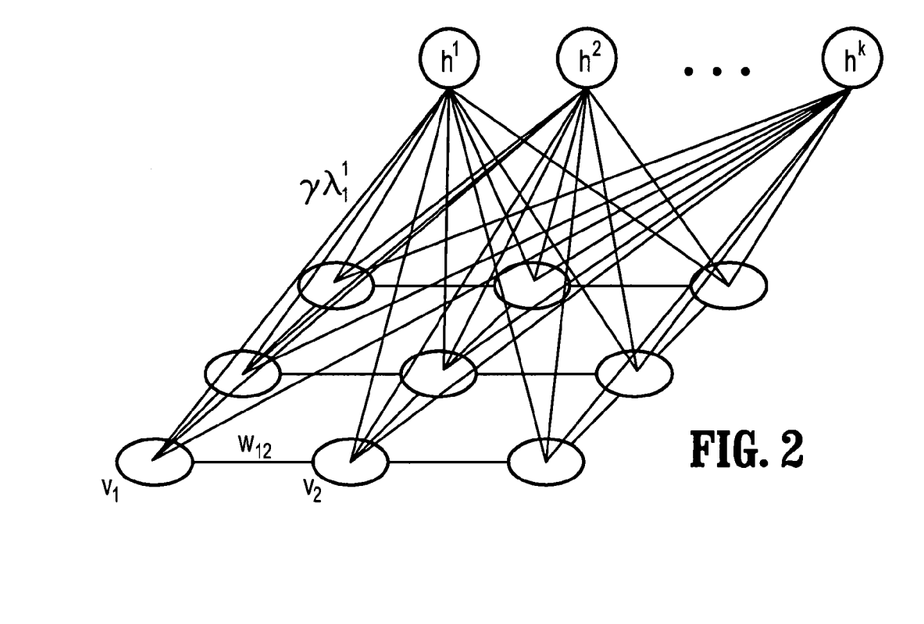
FIG. 2 depicts a comparison of a lattice with known priors and a lattice modified to include an extra (labeled) nodes for each label that is connected to each node in the lattice, according to an embodiment of the invention.

FIG. 2 depicts a comparison of equation (4) for a lattice with known priors and equation (1) for a lattice modified to include an extra (labeled) node $h^s$ for each label, $g^s$, that is connected to each node in the lattice, $v_i$, with weight equal to $\gamma \lambda_i^s$. For these cases, equations (4) and (1) represent the same system with $Bf^s = \lambda^s$ and $L_U$ is simply the Laplacian for the lattice. The additions to the diagonal of L representing the lattice in (4) is residue from the deletion of the marked (floating) nodes. Therefore, the incorporation of priors in equation (4) yields the same solution as would be obtained for the random walker probabilities on an augmented graph. It is more convenient to consider the augmented graph, since the inclusion of priors can now be treated in the original, random walker, framework. Specifically, the proofs given in this inventor's copending application titled "System and Method for Multi-Label Image Segmentation", concerning the robustness and behavior of the random walker algorithm also apply when priors are included, since the inclusion of priors is equivalent to the original random walker problem solved on the augmented graph of FIG. 2. Note that use of pre-labeled nodes with priors also leads to solving (4) on the augmented graph. The solution obtained through incorporation of priors into the total energy functional is equivalent to the solution to the original random walkers algorithm on the augmented graph in FIG. 2. Note that, because of the identification of the minimization of the total energy functional with the general random walker problem, the solutions $x_i^s$ found for each label $g^s$ are guaranteed to sum to unity as required by a probability:

$$\sum_s x_i^s = 1.$$

The unity constraint for each node indicates that only k−1 solutions to (4) are required.

Figure 3:
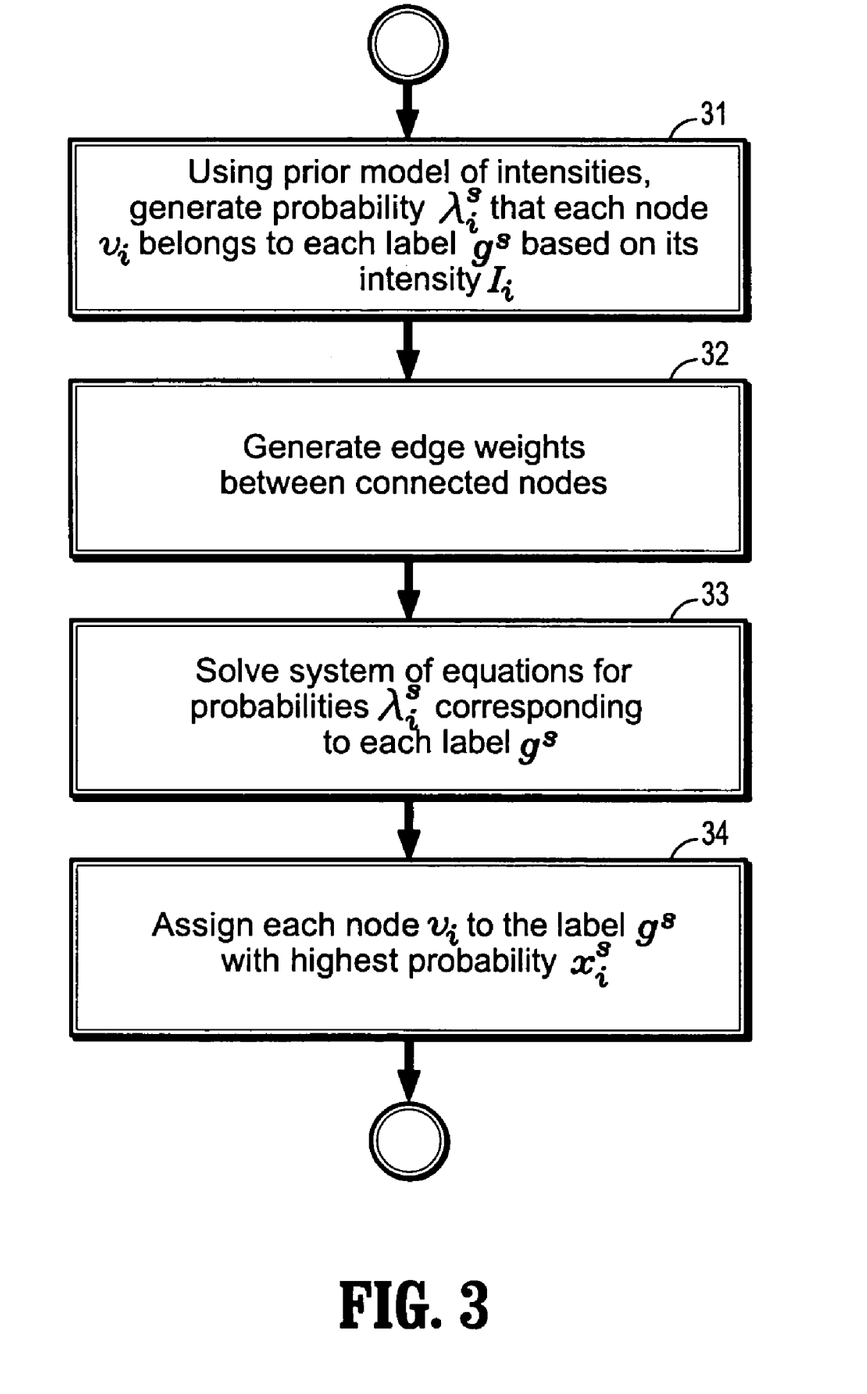
FIG. 3 depicts a flow chart of a multigrid solver with known priors according to an embodiment of the invention.

A flow chart of an algorithm for incorporating prior models into a random walk, according to an embodiment of the invention, is depicted in FIG. 3. At step 31, using a prior model of label intensities (possibly obtained through estimation from user interaction), a probability $\lambda_i^s$ is generated that each node $v_i$ belongs to each label $g^s$ based on its intensity $I_i$. Since segmentation tasks are often specified in the context of a particular problem domain, the number of desired labels is typically known a priori and a probability density estimation may be generated from training (i.e., prelabeled) images via a wide array of techniques, as are known in the art.

One exemplary kernel estimation to produce the probability densities assumes hat there is a set of training nodes, with intensities denoted $T = \{t_1, t_2, \ldots, t_c\}$, and corresponding labels, denoted $R = \{r_1, r_2, \ldots, r_c\}$, where $c = |T| = |R|$ is the number of training points and $r_i \in G$. Note that the training points can be defined with prior training images, or could be given interactively by a user. Each image intensity is quantized to 256 levels, to preserve reuse of parameters across image modalities, and a Gaussian kernel was used to produce the densities corresponding to each of the k labels.

The probability $\lambda_i^s$ that node $v_i$ is generated from the distribution corresponding to label $g^s$ is generated through $$\lambda_i^s = \frac{1}{Z^s} \sum_{q=g^s} \exp\left(\frac{(I_i - t_q)^2}{\sigma}\right)$$

where $\sigma$ is a free parameter and $Z^s$ is a normalizing constant for label $g^s$ equal to $$Z^s = \sum_{p=0}^{255} \sum_{q=g^s} \exp\left(\frac{(p - t_q)^2}{\sigma}\right)$$

According to a further embodiment of the invention, a normalized histogram is generated from the Gaussian kernels for each label and the probabilities are simply read off for each test intensity. Of course, an intensity profile may not be the most appropriate descriptor for some segmentation tasks. It is to be understood that the exemplary intensity description presented herein is purely for the simplicity of exposition. According to another embodiment of the invention, distributions based on a texture analysis or filtering can be generated, depending on the type of segmentation task.

At step 32, edge weights, $w_{ij}$ are generated between connected nodes $v_i$ and $v_j$. Many possible functions exist for mapping nodal intensities to connecting weights. One exemplary weight function uses the ubiquitous Gaussian, $\exp(-\beta (I_i-I_j)^2)$:

$$w_{ij} = \exp\left(\frac{\beta}{\rho}(I_i - I_j)^2\right) + \varepsilon$$

where $\varepsilon$ is a small constant (a value of $\varepsilon=10^{-6}$) and $\rho$ is a normalizing constant $\rho=\max(I_i-I_j)$, $\forall i, j$. This modified Gaussian weight function helps to keep the choice of $\beta$ relevant to images of different quantization and contrast, as well to ensure that none of the weights go identically to zero.

The system of equations defined in (4) (or (5) if user-specified labels are included) is solved at step 33 for the probabilities $x_i^s$ corresponding to each label $g^s$. This need be done only k−1 times, since the final set of probabilities may be calculated via the unity sum condition, $$x_i^k = 1 - \sum_{s<k} x_i^s.$$

As with the original random walker algorithm, the extended random walker algorithm according to an embodiment of the invention involves the solution to the large, sparse, symmetric, positive-definite, system of linear equations. Many methods are known in the art for solving such a system of equations. The memory consumption of most direct methods (e.g., LU decomposition) precludes practical use except in the case of small images. Alternatively, iterative methods as are known in the art, such as the preconditioned conjugate gradient technique, can be used, due to acceptable memory consumption and easy parallelization.

If the prior distributions were uniform, then $$\gamma \sum_{s=1}^{k} \Lambda^s = \frac{\gamma k}{n} I,$$

and the addition of this matrix to L, or $L_M$, if user-defined seeds are used, would be guaranteed to reduce the (Euclidean) condition number that is known to affect the convergence of conjugate gradients. Although the densities will not, in general, be uniform, numerical experiments indicate an improvement in the convergence of the conjugate gradient method when applied to (5) over (1).

At step 34, each node $v_i$ is assigned to the label $g^s$ with highest probability, $x_i^s$, that is, $y_i = \max_s(x_i^s)$.

Given a fixed quantization, and a number of training points and labels that are independent of the number of pixels, the density estimation is a constant time operation and the subsequent assignment of a probability to each node is O(n). Solving the system of linear equations defined in (5) is the main computational hurdle of the algorithm and, in practice, requires the most time. However, if a graph of bounded degree d is employed on the unlabeled nodes (e.g., d=4 for a 4-connected lattice), then the sparse matrix multiply employed in each iteration of conjugate gradients requires no greater than dn operations. Consequently, if is assumed that a fixed number of iterations are employed, then the solution to the system of equations is performed in O(n) operations. Because each phase, including the initial weight assignment and final pixelwise maximum likelihood segmentation, are linear time operations, an algorithm according to an embodiment of the invention requires O(n) operations.

In practice, a complete segmentation according to an embodiment of the invention, from initial prior and weight/matrix generation to final label assignment, can be performed in approximately 3 seconds for a 256×256 image on an Intel Xeon 2.40 GHz with 3 GB of RAM.

Figure 4:
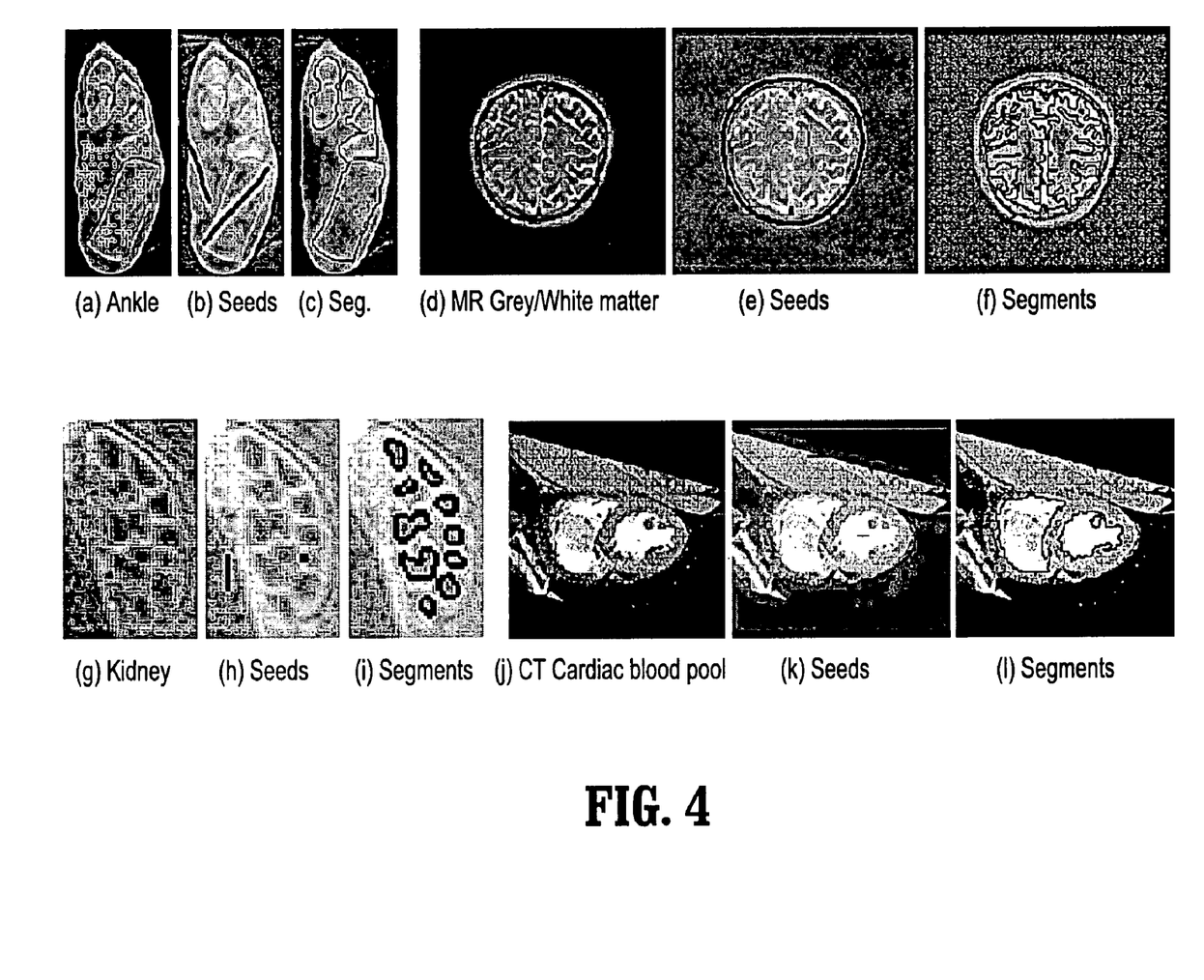
FIGS. 4(a)-(l) illustrate four examples of medical images that have been segmented with an extended random walker algorithm, according to an embodiment of the invention.

FIGS. 4(*a*)-(*l*) illustrate four examples of medical images that have been segmented with an extended random walker algorithm, according to an embodiment of the invention. Each example includes three images: one showing a structure to be segmented, a second, labeled "Seeds", showing the seeds, and the third, labeled "Segments", depicting the segmented image. The user specified labels in the "Seeds" figure are indicated by black lines. The black lines in the "segments" figure indicate segment boundaries. Each image had two seed groups, except for the gray/white matter segmentation (FIGS. 4(*d*)-(*f*)), which has three groups (gray matter, white matter, background). All of the seeds inside the brain are gray matter seeds except for the vertical line in the center of the white matter. All of the segmentations therein illustrated were performed using the same parameter values: $\beta=500$, $\gamma=1e^{-2}$, $\sigma=100$. In each of the images in FIG. 4, the labeled object is disconnected, preventing straightforward application of a prior art random walker technique. However, a density estimation of the intensity is also insufficient to characterize the objects without introducing significant noise into the final segmentation.

Although FIGS. 4(*a*)-(*l*) displays results from medical images, there is nothing inherent about an extended random walker algorithm according to an embodiment of the invention that pertains specifically to medical images. The methods disclosed herein, including both the original random walker algorithm and the extension according to an embodiment of the invention, are general purpose segmentation tools that makes no assumptions about the image type or the segmentation task.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 5:
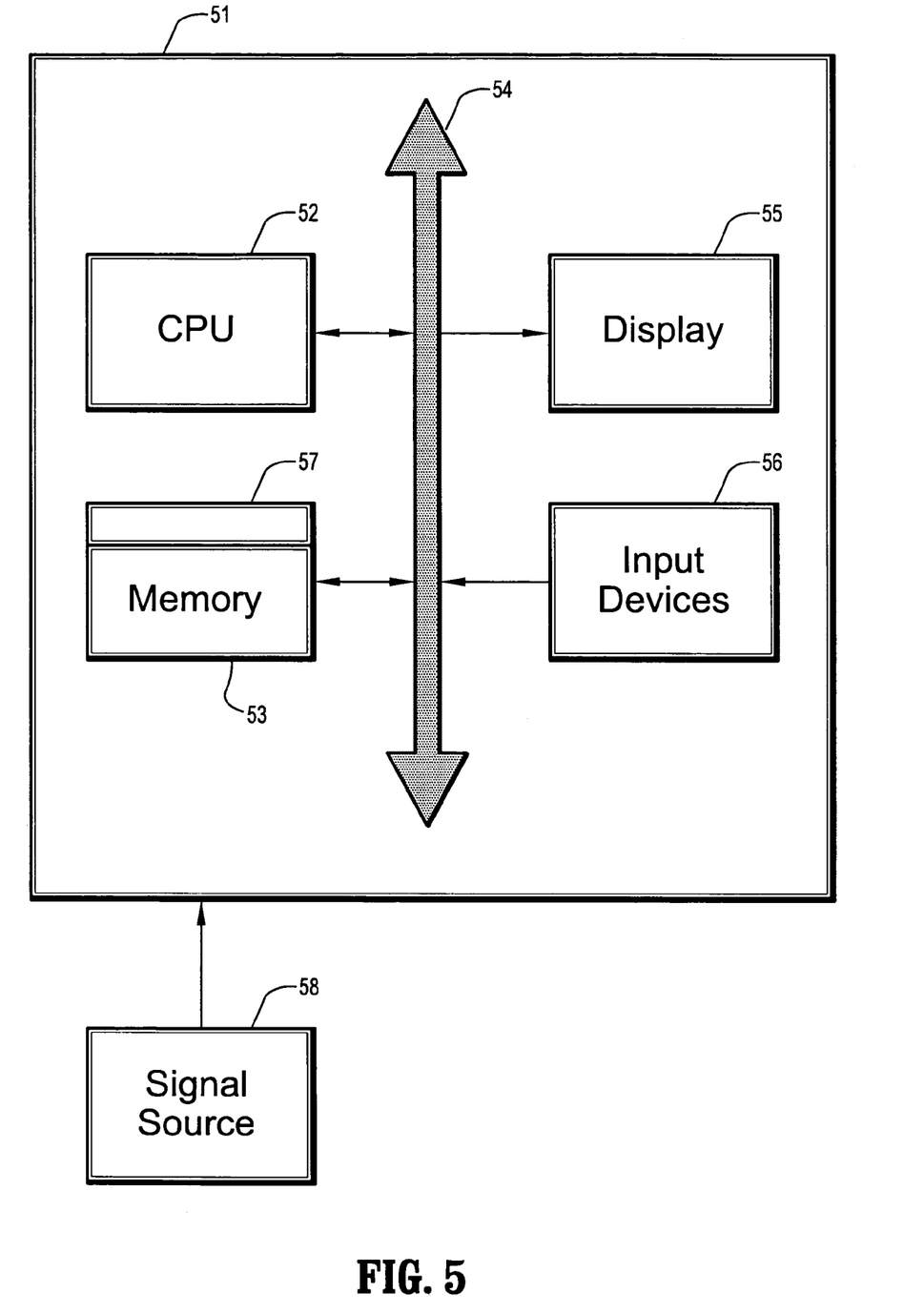
FIG. 5 is a block diagram of an exemplary computer system for implementing a extended random walker scheme according to an embodiment of the invention.

FIG. 5 is a block diagram of an exemplary computer system for implementing a extended random walker scheme according to an embodiment of the invention. Referring now to FIG. 5, a computer system 51 for implementing the present invention can comprise, inter alia, a central processing unit (CPU) 52, a memory 53 and an input/output (I/O) interface 54. The computer system 51 is generally coupled through the I/O interface 54 to a display 55 and various input devices 56 such as a mouse and a keyboard. The support circuits can include circuits such as cache, power supplies, clock circuits, and a communication bus. The memory 53 can include random access memory (RAM), read only memory (ROM), disk drive, tape drive, etc., or a combinations thereof. The present invention can be implemented as a routine 57 that is stored in memory 53 and executed by the CPU 52 to process the signal from the signal source 58. As such, the computer system 51 is a general purpose computer system that becomes a specific purpose computer system when executing the routine 57 of the present invention.

The computer system 51 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of segmenting a digitized image using a computer system comprising the steps of:

providing a digitized image comprising a plurality of intensities corresponding to a domain of nodes on an N-dimensional grid;

generating prior probabilities for a set of segments by defining a set of training nodes and estimating said prior probability density from a set of training images, wherein the prior probability $\lambda_i^s$ that a node $v_i$ is generated from a distribution corresponding to a segment $g^s$ is generated through $$\lambda_i^s = \frac{1}{Z^s} \sum_{q=g^s} \exp\left(\frac{(I_i - t_q)^2}{\sigma}\right),$$

wherein the sum is over all segments, $\sigma$ is a free parameter, $I_i$ is the intensity of node $v_i$, $t_q$ is the intensity of training node labeled by q, $Z^s$ is a normalizing constant for segment $g^s$ equal to $$Z^s = \sum_{p=0}^{255} \sum_{q=g^s} \exp\left(\frac{(p - t_q)^2}{\sigma}\right),$$

wherein the sum over p is over all intensity levels, and initializing probabilities that each node belongs to each segment;

defining a weight between each pair of adjacent nodes in the image based on the intensity difference of each said node pair;

formulating a set of equations that minimize an energy functional of the probabilities and weights, and solving said set of equations using the computer system for the probability that each node belongs to each segment.

2. The method of claim 1, wherein each said weight $w_{ij}$ between a node $v_i$ adjacent to node $v_j$ is determined by $$w_{ij} = \exp\left(\frac{\beta}{\rho}(I_i - I_j)^2\right) + \varepsilon,$$

wherein $I_i$ and $I_j$ are the intensities of nodes i and j, respectively, $\beta$ is a free parameter, $\varepsilon$ is a constant and $\rho$ is a normalizing factor.

3. The method of claim 2, wherein $\varepsilon$ is positive and much less than 1, and $\rho=\max(I_i-I_j)$ for all nodes i,j.

4. The method of claim 1, wherein the prior probabilities for the set of segments are known a priori.

5. The method of claim 4, further comprising representing said image by a Laplacian matrix L indexed by node pairs, wherein an element $L_{ij}$ for nodes i and j is defined by $$L_{ij} = \begin{cases} d_i & \text{if } i = j, \\ -w_{ij} & \text{if } i \text{ and } j \text{ represent adjacent nodes}, \\ 0 & \text{otherwise}, \end{cases}$$

wherein $d_i = \Sigma w_{ij}$ for all weights incident on node i.

6. The method of claim 5, wherein said set of equations is $$\left(L + \gamma \sum_{r=1}^{k} \Lambda^r\right) x^s = \lambda^s,$$

wherein L is said Laplacian matrix, $x^s$ is a vector of probabilities that each node belongs to a segment labeled by s, $\lambda^s$ is a vector of prior probabilities that each node belongs to a probability distribution for a segment labeled by s, $\Lambda^r$ is a diagonal matrix formed from said prior probabilities $\lambda^s$, and $\gamma$ is a free parameter.

7. The method of claim 6, further comprising user-marked nodes identifying said segments, and wherein said set of equations for unmarked nodes is $$\left(L_U + \gamma \sum_{r=1}^{k} \Lambda_U^r\right) x_U^s = \lambda_U^s + Bf^s,$$

wherein L is decomposed as $$L = \begin{bmatrix} L_M B \\ B^T L_U \end{bmatrix},$$

wherein $L_M$ is the Laplacian for the marked points $L_U$ is the Laplacian for the unmarked points, and B comprises those elements of L that are left over, And $f^s$ is a function.

8. The method of claim 1, wherein said set of equations are solved using a preconditioned conjugate gradient technique.

9. The method of claim 1, wherein each node is assigned to a segment with a highest probability.

10. The method of claim 1, wherein the prior probabilities are generated based on a texture analysis of said image.

11. The method of claim 1, further comprising filtering said image before generating the prior probabilities.

12. A method of segmenting a digitized image using a computer system comprising the steps of:
   providing a digitized image comprising a plurality of intensities corresponding to a domain of nodes on an N-dimensional grid;
   generating prior probabilities for a set of segments, and initializing probabilities that each node belongs to each segment;
   solving a set of equations using the computer system for the probability that each node belongs to each segment defined by $$\left(L + \gamma \sum_{r=1}^{k} \Lambda^r\right) x^s = \lambda^s,$$

wherein L is a Laplacian matrix, $x^s$ is a vector of probabilities that each node belongs to a segment labeled by s, $\lambda^s$ is a vector of prior probabilities that each node belongs to a probability distribution for a segment labeled by s, $\Lambda$ is a diagonal matrix formed from said prior probabilities, and $\gamma$ is a free parameter; and
   assigning each node to a segment with a highest probability.

13. The method of 12, wherein said Laplacian matrix L is indexed by node pairs, wherein an element $L_{ij}$ for nodes i and j is defined by $$L_{ij} = \begin{cases} d_i & \text{if } i = j, \\ -w_{ij} & \text{if } i \text{ and } j \text{ represent adjacent nodes}, \\ 0 & \text{otherwise}, \end{cases}$$

wherein $d_i = \Sigma w_{ij}$ for all weights incident on node i, wherein said $w_{ij}$ is a weight between a node $v_i$ adjacent to node $v_j$ determined by $$w_{ij} = \exp(-\beta(I_i - I_j)^2),$$

wherein $I_i$ and $I_j$ are the intensities of nodes i and j, respectively, and $\beta$ is a free parameter.

14. A program storage device readable by a computer, tangibly embodying a program of instructions executable by the computer to perform method steps for segmenting a digitized image, said method comprising the steps of:
   providing a digitized image comprising a plurality of intensities corresponding to a domain of nodes on an N-dimensional grid;
   providing prior probabilities for a set of segments, and initializing probabilities that each node belongs to each segment;
   defining a weight between each pair of adjacent nodes in the image based on the intensity difference of each said node pair, wherein each said weight $w_{ij}$ between a node $v_i$ adjacent to node $v_j$ is determined by $$w_{ij} = \exp\left(\frac{\beta}{\rho}(I_i - I_j)^2\right) + \varepsilon,$$

wherein $I_i$ and $I_j$ are the intensities of node i and j, respectively, $\beta$ is a free parameter, $\epsilon$ is a positive constant wherein $\epsilon \ll 1$, $\rho = \max(I_i\text{-}I_j)$ for all nodes i,j is a normalizing factor;
   formulating a set of equations that minimize an energy functional of the probabilities and weights, and solving said set of equations for the probability that each node belongs to each segment.

15. The computer readable program storage device of claim 14, wherein the prior probabilities for the set of segments are known a priori.

16. The computer readable program storage device of claim 15, further comprising representing said image by a Laplacian matrix L indexed by node pairs, wherein an element $L_{ij}$ for nodes i and j is defined by $$L_{ij} = \begin{cases} d_i & \text{if } i = j, \\ -w_{ij} & \text{if } i \text{ and } j \text{ represent adjacent nodes}, \\ 0 & \text{otherwise}, \end{cases}$$

wherein $d_i = \Sigma w_{ij}$ for all weights incident on node i.

17. The computer readable program storage device of claim 16, wherein said set of equations is $$\left(L + \gamma \sum_{r=1}^{k} \Lambda^r\right) x^s = \lambda^s,$$

wherein L is said Laplacian matrix, $x^s$ is a vector of probabilities that each node belongs to a segment labeled by s, $\lambda^s$ is a vector of prior probabilities that each node belongs to a probability distribution for a segment labeled by s, $\Lambda^r$ is a diagonal matrix formed from said prior probabilities $\lambda^s$, and $\gamma$ is a free parameter.

18. The computer readable program storage device of claim 17, further comprising user-marked nodes identifying said segments, and wherein said set of equations for unmarked nodes is $$\left(L_U + \gamma \sum_{r=1}^{k} \Lambda_U^r\right) x_U^s = \lambda_U^s + Bf^s,$$

wherein L is decomposed as $$L = \begin{bmatrix} L_M & B \\ B^T & L_U \end{bmatrix},$$

wherein $L_M$ is the Laplacian for the marked points, $L_U$ is the Laplacian for the unmarked points, and B comprises those elements of L that are left over, and $f^s$ is a function.

19. The computer readable program storage device of claim 14, wherein said set of equations are solved using a preconditioned conjugate gradient technique.

20. The computer readable program storage device of claim 14. wherein generating prior probabilities comprises defining a set of training nodes and estimating said prior probability density from a set of training images, wherein the prior probability $\lambda_i^s$ that a node $v_i$ is generated from a distribution corresponding to a segment $g^s$ is generated through $$\lambda_i^s = \frac{1}{Z^s} \sum_{q=g^s} \exp\left(\frac{(I_i - t_q)^2}{\sigma}\right),$$

wherein the sum is over all segments, $\sigma$ is a free parameter, $I_i$ is the intensity of node $v_i$, $t_q$ is the intensity of training node labeled by q, $Z^s$ is a normalizing constant for segment $g^s$ equal to $$Z^s = \sum_{p=0}^{255} \sum_{q=g^s} \exp\left(\frac{(p - t_q)^2}{\sigma}\right),$$

wherein the sum over p is over all Intensity levels.

21. The computer readable program storage device of claim 14, wherein each node is assigned to a segment with a highest probability.

22. The computer readable program storage device of claim 14,wherein the prior probabilities are generated based on a texture analysis of said image.

23. Amended) The computer readable program storage device of claim 14, the method further comprising filtering said image before generating the prior probabilities.

* * * * *